United States Patent
Katou

(10) Patent No.: US 7,025,706 B2
(45) Date of Patent: Apr. 11, 2006

(54) SHIFT HYDRAULIC APPARATUS FOR VEHICULAR AUTOMATIC TRANSMISSION

(75) Inventor: Yoshiaki Katou, Kanagawa (JP)

(73) Assignees: Jatco LTD, Fuji (JP); Nissan Motor Co., Ltd., Yokohama (JP)

( * ) Notice: Subject to any disclaimer, the term of this patent is extended or adjusted under 35 U.S.C. 154(b) by 72 days.

(21) Appl. No.: 10/770,549

(22) Filed: Feb. 4, 2004

(65) Prior Publication Data

US 2004/0157700 A1 Aug. 12, 2004

(30) Foreign Application Priority Data

Feb. 6, 2003 (JP) ............................... 2003-029176

(51) Int. Cl.
  *B60K 41/12* (2006.01)
(52) U.S. Cl. ..................... 477/45; 477/50; 475/127
(58) Field of Classification Search .............. 477/45, 477/50, 40, 52; 475/127, 128
See application file for complete search history.

(56) References Cited

U.S. PATENT DOCUMENTS

| | | | |
|---|---|---|---|
| 5,788,600 A * | 8/1998 | Tsukamoto et al. ............ | 477/45 |
| 6,217,473 B1 * | 4/2001 | Ueda et al. .................. | 475/216 |
| 6,739,998 B1 * | 5/2004 | Iwata et al. ................. | 475/127 |
| 6,800,044 B1 * | 10/2004 | Inamura ....................... | 474/18 |
| 2004/0063523 A1 * | 4/2004 | Jozaki et al. ................. | 474/18 |
| 2004/0063525 A1 | 4/2004 | Ochiai et al. | |
| 2004/0063526 A1 | 4/2004 | Nobu | |
| 2004/0063543 A1 | 4/2004 | Wakayama | |
| 2004/0127313 A1 | 7/2004 | Shimanaka et al. | |
| 2004/0127330 A1 | 7/2004 | Sawada et al. | |
| 2004/0127331 A1 | 7/2004 | Sawada et al. | |
| 2004/0128046 A1 | 7/2004 | Yamamoto et al. | |

OTHER PUBLICATIONS

U.S. Appl. No. 10/670,270, filed Sep. 26, 2003, Nobu.
A. Fujikawa et al., "Hydraulic and Electronic Control System of CVT for Hybrid Vehicle", Society of Automotive Engineers of Japan, Inc., pre-publication No. 20005220, May 24, 2000, pp. 1-4.

* cited by examiner

*Primary Examiner*—Tisha Lewis
(74) *Attorney, Agent, or Firm*—Foley & Lardner LLP

(57) ABSTRACT

A shift hydraulic apparatus and method are provided for a vehicular automatic transmission constituted by a torque converter and a continuously variable transmission. A bypass circuit enables an upstream side hydraulic circuit of the hydraulic circuit to communicate with a downstream side hydraulic circuit. A switching valve enables a switching between a communication state of the bypass circuit and a non-communication state thereof. Through the switching valve, both communication state and the non-communication state of the bypass circuit are controlled.

16 Claims, 7 Drawing Sheets

(MAP3)

RAMP CONTROL

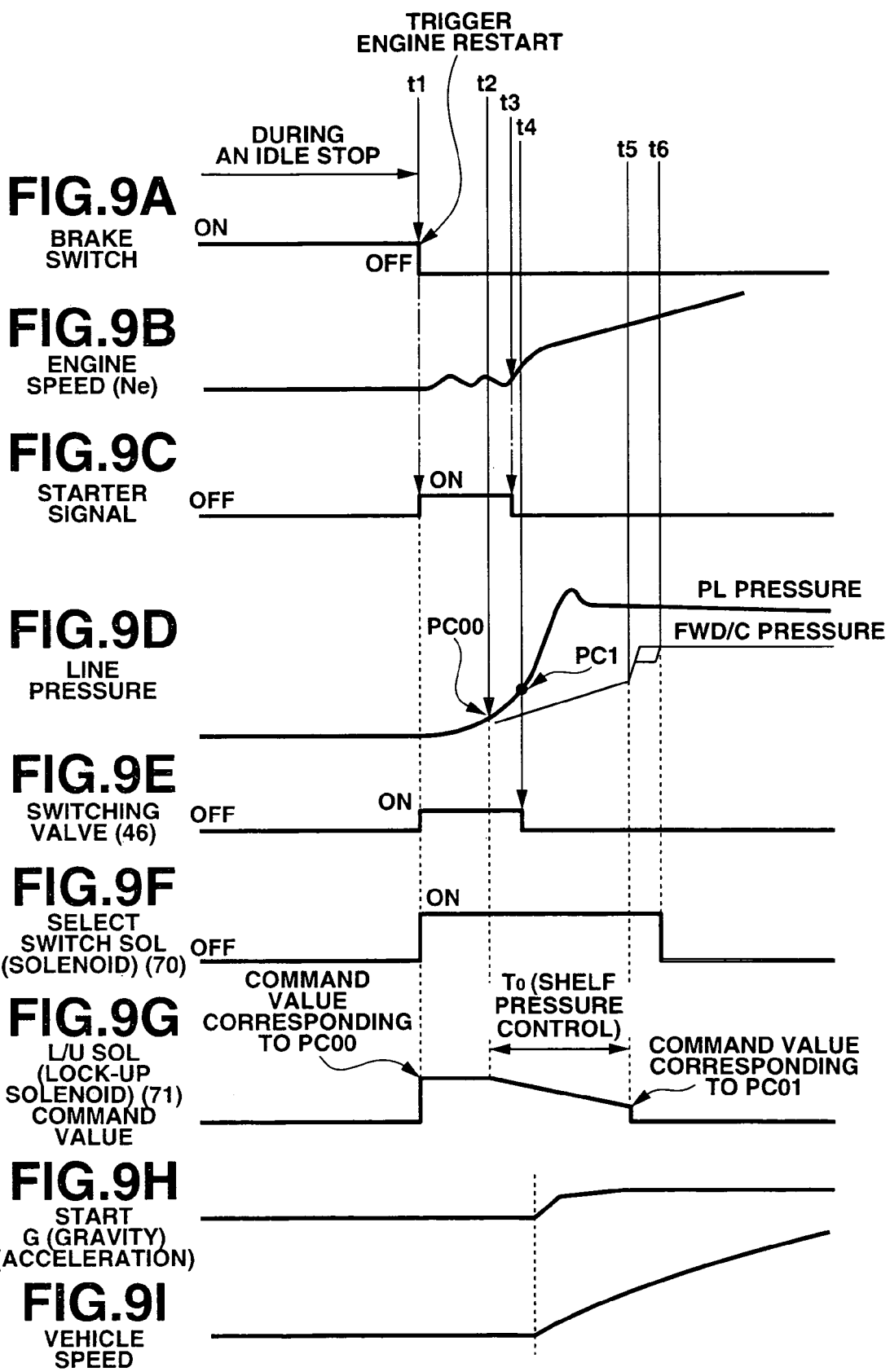

SHIFT HYDRAULIC APPARATUS FOR VEHICULAR AUTOMATIC TRANSMISSION

BACKGROUND

The present invention relates to a gear shift hydraulic apparatus for a vehicular automatic transmission in which an idle stop control is equipped. In particular, the invention relates to a gear shift hydraulic pressure apparatus applicable to a belt type continuously variable transmission (so-called, CVT).

A previously proposed shift hydraulic apparatus for a vehicular automatic transmission is described in a pre-publication of academic lecture meeting of an automotive vehicle technology society (No. 67-00,20052220, titled Hydraulic and Electronic Control System of CVT for Hybrid Vehicle). In this paper (pre-publication), a technique of an idle stop vehicle in which a belt type continuously variable transmission having only an engine driven pump is mounted. In the system of the vehicle, a wet clutch is used as a start clutch and during a re-start of the vehicle after the idle stop, an engagement torque of the start clutch is regulated by means of an electronic hydraulic actuator and a timing of a rise in a transmission torque of a forward clutch is delayed at an earlier timing than that of a rise in a transmission torque of the start clutch. An orifice is adjusted on the hydraulic pressure circuit so that an occurrence of a belt slip of the CVT caused by a drain hydraulic pressure reduction immediately after the engine is restarted is prevented.

On the other hand, a hydraulic circuit has previously been proposed as another previously proposed shift hydraulic apparatus for a belt type continuously variable transmission in which a normally available torque converter is used as the start clutch. In the latter previously proposed hydraulic circuit, a delivery outlet (drainage outlet) of an oil pump is communicated with a pressure regulator valve regulating the pressure of a line pressure via a first oil passage. In addition, pressure regulator valve is communicated with a clutch regulator valve via the first oil passage. A drainage pressure of the oil pump is regulated by means of pressure regulator valve and a pulley clamp pressure is supplied from the drainage of the oil pump via a second oil passage. A third oil passage is provided having a first orifice on the third oil passage. A clutch regulator valve regulates a relief pressure of the pressure regulator valve and the line pressure supplied via the first orifice from the third oil passage so as to regulate a forward clutch pressure. A pilot pressure regulated by means of a pilot valve supplies an original pressure of each lock-up solenoid and a select switching solenoid via a fourth oil passage. Operations of a select switch valve and a select control valve are controlled in accordance with each corresponding solenoid. That is to say, each of the above-described lock-up and select solenoids controls select switching valve and select control valve. During an engine restart, the hydraulic developed from oil pump supplies the pulley clamp pressure via the second oil passage and the hydraulic is supplied to the forward clutch via such a route as a fifth oil passage from the clutch regulator valve→a sixth oil passage branched from the fifth oil passage→the select control valve→a seventh oil passage from select control valve to the select switching valve→select switching valve→an eighth oil passage from the select switching valve to a manual valve→the manual valve→a ninth oil passage. In a case of the previously proposed hydraulic circuit described above, an input torque immediately after the start of the vehicle is uniquely determined according to an engine speed and characteristics that the torque converter naturally has (a torque capacity coefficient and a stall torque ratio). In addition, on a hydraulic circuit of the forward clutch, an oil pump draining pressure is communicated with the first orifice so that the rise in the forward clutch engagement (clutching) pressure is delayed at a later timing than that of the rise in the pulley clamp pressure. Thus, the belt slip of the CVT and a shock due to a surge pressure developed at a clutching time of the forward clutch are prevented from occurring.

However, in the latter previously proposed hydraulic apparatus, during the engine restart after the idle stop is ended, the input torque is automatically determined depending on how the rise in engine speed is carried out. Furthermore, the hydraulic supplied to forward clutch is the line pressure via first and second orifices. The second orifice is interposed in the oil passage from the manual valve to the forward clutch. Hence, the rise in the forward clutch engagement (clutching) pressure is remarkably or extremely delayed. Consequently, a large shock is developed during the clutching of the forward clutch.

SUMMARY

It is, hence, an object of the present invention to provide a shift hydraulic apparatus for a vehicular automatic transmission (the automatic transmission recited in the whole specification includes the belt type continuously variable transmission) which is capable of supplying an oil flow quantity supplied from the oil pump to the forward clutch without providing a response delay.

According to one aspect of the present invention, there is provided a shift hydraulic apparatus for a vehicular automatic transmission, the automatic transmission being constituted by a torque converter and a continuously variable transmission the shift hydraulic apparatus comprising: an oil pump that is always driven by means of an engine associated with the automatic transmission; a clamp pressure regulating section, disposed on an upstream side hydraulic circuit with the oil pump as a hydraulic source, that regulates a clamp pressure of a belt of the continuously variable transmission; a clutch pressure regulating section, disposed on a downstream side hydraulic circuit with a drain pressure from the clamp pressure regulating section, that regulates a clutching pressure of a forward clutch; a bypass circuit which enables to communicate the upstream side hydraulic circuit with the downstream side hydraulic circuit; a switching valve which enables a switching between a communication state of the bypass circuit and a non-communication state of the bypass circuit; and a switching valve controlling section that controls the communication state and the non-communication state of the bypass circuit through the switching valve.

According to another aspect of the present invention, there is provided a shift hydraulic method for a vehicular automatic transmission, the automatic transmission being constituted by a torque converter and a continuously variable transmission, the shift hydraulic method comprising: providing an oil pump that is always driven by means of an engine associated with the automatic transmission; providing a clamp pressure regulating section, disposed on an upstream side hydraulic circuit with the oil pump as a hydraulic source, that regulates a clamp pressure of a belt of the continuously variable transmission; providing a clutch pressure regulating section, disposed on a downstream hydraulic circuit with a drain pressure from the clamp pressure regulating section, that regulates a clutching pressure of a forward clutch; providing a bypass circuit which enables to communicate the upstream side hydraulic circuit with the downstream side hydraulic circuit; providing a switching valve which enables a switching between a communication state of the bypass circuit and a non-communication state of the bypass circuit; and controlling the communication state and the non-communication state of the bypass circuit through the switching valve.

This summary of the invention does not necessarily describe all necessary features so that the invention may also be a sub-combination of these described features.

BRIEF DESCRIPTION OF THE DRAWINGS

FIGS. 9A, 9B, 9C, 9D, 9E, 9F, 9G, 9H, and 9I show integrally a timing chart representing operation of an engine restart control in the shift hydraulic apparatus in the embodiment shown in FIGS. 1 and 2.

DETAILED DESCRIPTION

Reference will hereinafter be made to the drawings in order to facilitate a better understanding of the present invention.

Figure 1:
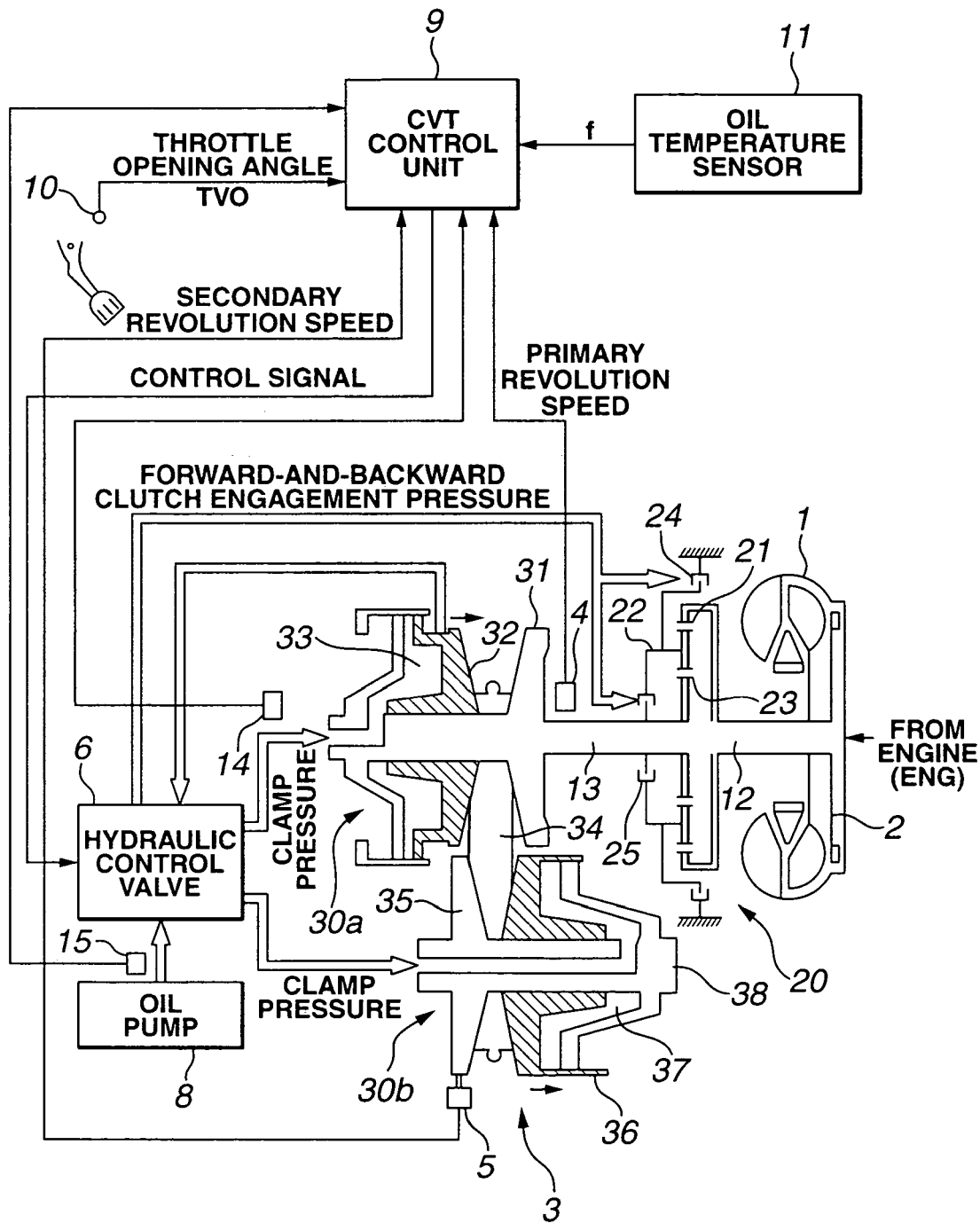
FIG. 1 is a circuit block diagram of an essential structure of a vehicular main unit in which a belt type continuously variable transmission is equipped to which a shift hydraulic apparatus in a preferred embodiment according to the present invention is applicable

FIG. 1 shows a control system of an automatic transmission having a belt type continuously variable transmission (CVT) 3 to which a shift hydraulic apparatus in a preferred embodiment according to the present invention is applicable. In FIG. 1, a reference numeral 2 denotes a lock-up clutch, a reference numeral 3 denotes CVT, a reference numeral 4 denotes a primary (primary pulley) revolution speed sensor, a reference numeral 5 denotes a secondary (pulley) revolution speed sensor, a reference numeral 6 denotes a hydraulic pressure control valve unit, a reference numeral 8 denotes an oil pump driven by means of an engine, a reference numeral 9 denotes a CVT control unit, a reference numeral 10 denotes an accelerator opening angle sensor, and a reference numeral 11 denotes an oil temperature sensor. CVT control unit 9 is a controller having a microcomputer system.

A torque converter 1 is linked to an engine output axle as a revolution transmission mechanism. Lock-up clutch 2 is installed which directly couples engine (ENG) to CVT 3. An output side of torque converter 1 is linked to a ring gear 21 of a forward-and-backward switching mechanism 20. Forward-and-backward switching mechanism 20 is constituted by a planetary gear mechanism having a ring gear 21, a pinion carrier 22, and sun gears 23 linked to a transmission input axle 13. Pinion carrier 22 is provided with a backward brake 24 to fix pinion carrier 22 onto a transmission casing and a forward clutch (FWD/C) 25 which is integrally linked to pinion carriers 22 and transmission input axle 13.

A primary pulley 30a of CVT 3 is disposed on an end of transmission input axle 13. CVT 3 includes the above-described primary pulley 30a, a secondary pulley 30b, and a belt 34 which transmits a revolution force (torque) to a secondary pulley 30b. Primary pulley 30a includes a stationary circular conical plate 31 which is integrally revolved with transmission input axle 13 and a movable circular conical plate 32 which is faced against stationary conical plate 31 and is movable in the axial direction of transmission input axle 13 by means of a hydraulic (oil pressure) acted upon a primary pulley cylinder chamber 33. Secondary pulley 30b is disposed on a driven axle 38. Secondary pulley 30b includes a stationary circular conical plate 35 integrally revolved with driven axle 38 and a movable truncated conical plate 36 which is faced against stationary circular conical plate 35 and is movable in the axial direction of driven axle 38 by means of a hydraulic acted upon in a secondary pulley cylinder chamber 37.

A drive gear (not shown) is fixedly attached onto driven axle 38. This drive gear drives a drive shaft coupled to road wheels (not shown) via a pinion, a final gear, and a differential unit disposed on an idler axle.

A revolution force (torque) inputted from engine output axle 12 to CVT 3 is transmitted to torque converter 1 and forward-and-backward switching mechanism 20. The revolution force of transmission input axle 13 is transmitted to a differential unit via primary pulley 30a, belt 34, secondary pulley 30b, a driven axle 38, the drive gear, an idler gear, an idler axle, the pinion, and a final gear. When the power transmission as described above is carried out, movable conical plate 32 of primary pulley 30a and movable conical plate 36 of secondary pulley 30b are axially moved to vary a contact position radius onto belt 34. Thus, a revolution ratio between primary pulley 30a and secondary pulley 30b, namely, a transmission gear ratio can be varied. A control to vary a width of a letter-V shaped pulley groove is carried out by executing a hydraulic control over either primary pulley cylinder chamber 33 or secondary pulley cylinder chamber 37 via CVT control unit 8.

CVT control unit 9 includes a throttle opening angle TVO from a throttle valve opening angle sensor 10, a transmission internal oil temperature f from oil temperature sensor 11, a primary revolution speed Npri from primary revolution speed sensor 4, a secondary revolution speed Nsec from secondary revolution speed sensor 5, an oil pump sensor 15, and a pulley clamp pressure from pulley clamp pressure sensor 14. The control signal is calculated on the basis of this input signal and a control signal is outputted to hydraulic control valve unit 6. Hydraulic control valve unit 6 receives the accelerator opening angle, transmission gear ratio (speed ratio), and an input axle revolution speed, and a primary hydraulic pressure. A gear shift control is carried out by supplying a control pressure to primary pulley cylinder chamber 33 and secondary pulley cylinder chamber 37.

Figure 2:
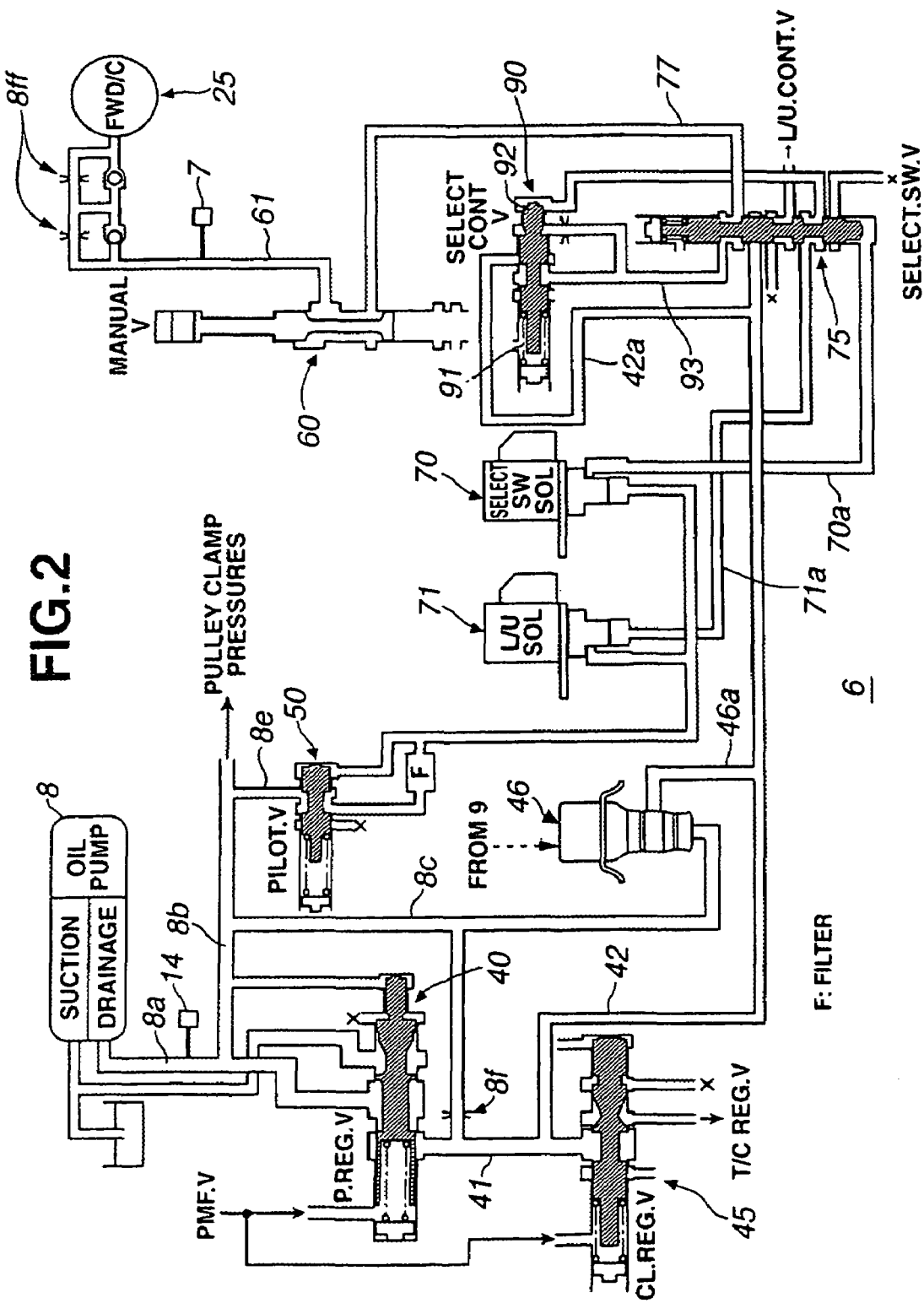
FIG. 2 is a schematic hydraulic circuit diagram representing a structure of a hydraulic circuit of the shift hydraulic apparatus shown in FIG. 1.

FIG. 2 shows a detailed hydraulic circuit block diagram representing a hydraulic circuit of the shift hydraulic apparatus for the vehicular belt type continuously variable transmission in the preferred embodiment according to the present invention. In FIG. 2, a reference numeral 40 denotes a pressure regulator valve which regulates a drainage pressure of oil pump 8 supplied from oil passage 8*a* coupled to a drain outlet oil pump 8 as a line pressure (pulley clamp pressure). Oil passage 8*b* is communicated with oil passage 8*a*. Oil passage 8*b* is an oil passage supplying a pulley clamp pressure to clamp belt 34 to primary pulley cylinder chamber 33 of CVT 3 and secondary pulley cylinder chamber 37 of CVT 3. In addition, an oil passage 8*e* communicated with oil passage 8*b* supplies an original (or initial) pressure of a pilot valve 50.

A clutch regulator valve 45 is provided to regulate the forward clutch pressure with the hydraulic drained from pressure regulator valve 40. Pressure regulator valve 40 and clutch regulator valve 45 are communicated with each other via an oil passage 41. In addition, oil passage 41 is communicated with an oil passage 42 which supplies the pressure regulated hydraulic by means of clutch regulator valve (T/C REG. V) 45 to a select switching valve (SELECT. SW. V) 75 and a select control valve (SELECT CONT V) 90.

A switching valve 46 is provided for switching a communication state of pulley clamp pressure supply passage 8*b* with forward clutch pressure supplying oil passage 42. Pilot valve 50 is provided for setting a constant supply pressure toward a lock-up solenoid (L/U SOL) 71 and a select switching solenoid (SELECT SW SOL) 70. An output pressure of select switching solenoid 70 is supplied to select switching valve 75 via an oil passage 70*a*. Thus, an operation of select switching valve 75 is controlled through select switching solenoid 70. An output hydraulic pressure of lock-up solenoid 71 is supplied to select switching valve 75 from oil passage 71*a*.

If a signal pressure of a select switching solenoid 70 is turned to ON, a signal pressure of lock-up solenoid 71 is acted upon as a signal pressure of select control valve 90 via a select switching valve 75. In addition, with a signal of select switching solenoid 70 turned to OFF, the signal pressure of lock-up solenoid 71 is introduced out to a lock-up control valve (L/U CONT. V)(not shown in FIG. 2) via select switching valve 75. In a state where the signal pressure from the select switching solenoid 70 is zeroed and the signal pressure of lock-up solenoid 71 is zeroed, a signal pressure to select control valve 90 indicates zero state. At this time, a spool valve 92 of select control valve 90 is moved in a rightward direction as viewed from FIG. 2 due to a spring load of a return spring 91 of the select control valve 90.

In addition, a hydraulic (oil pressure) sensor 7 is disposed in an oil passage 61 communicating forward clutch (FWD/C) 25 with a manual valve (MANUAL V) 60.

Figure 3:
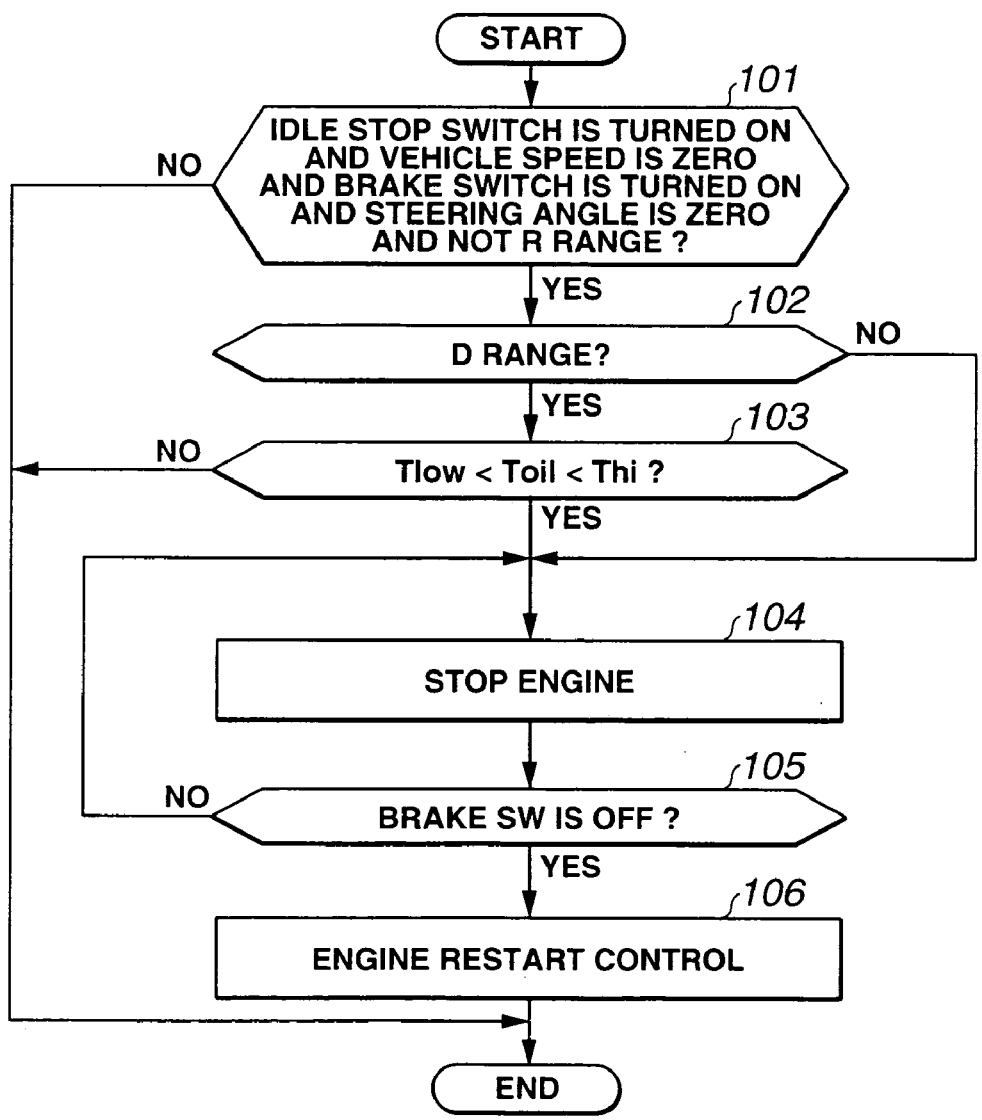
FIG. 3 is an operational flowchart representing a basic control of an idle stop control executed by a CVT control unit in the preferred embodiment according to the present invention.

FIG. 3 shows an operational flowchart representing a basic control contents of an idle stop control executed in the shift hydraulic apparatus in the preferred embodiment according to the present invention.

At a step 101, CVT control unit 9 (controller) determines whether all of engine idle stop conditions, viz., an idle switch is turned on, vehicle speed indicates zero, the brake switch is turned to ON, a steering angle is zeroed, and a transmission select lever is not at R (Reverse) range are satisfied. Only if all conditions are satisfied (Yes) at step 101, the routine shown in FIG. 3 goes to a step 102. If not (i.e., the at least one condition is not satisfied (No) at step 101), CVT control unit 9 neglects this idle stop control procedure.

At step 102, CVT control unit 9 determines whether the select position falls in a D (Drive) range. If D range (Yes) at step 102, the routine goes to a step 103. If not a D range (No) at step 102, the routine goes to a step 104. At step 103, CVT control unit 9 determines whether oil temperature Toil detected by oil temperature sensor 11 is higher than a lower limit oil temperature Tlow but is lower than an upper limit oil temperature Thi. If this condition is satisfied (Yes) (Tlow<Toil<Thi) at step 103, the routine goes to step 104. If not satisfied (No) at step 103, the routine is ended. At step 104, engine (ENG) is stopped. At a step 105, CVT control unit 9 determines if brake switch (BRAKE SW) is turned off. If the brake switch is turned off (Yes) at step 105, the routine goes to a step 106. If not at step 105, the routine returns to step 104. At the next step 106, CVT control unit 9 executes an engine restart control procedure as will be described later. That is to say, if the driver desires the idle stop control, with the vehicle stopped, the brake (pedal) being depressed, and steering angle is zeroed, the engine is stopped. It is noted that the idle stop switch serves to transmit a driver's intention to execute or deactivate the idle stop to CVT control unit 9 and the idle stop switch is turned on at a time point at which an ignition key is revolved to turn an ignition switch to ON. It is also noted that, in a case where the steering angle is zeroed, the idle stop is inhibited during a temporary stop and during, for example, a turn of the vehicle to a right direction (in Japan).

Next, CVT control unit 9 determines whether oil temperature Toil detected by oil temperature sensor 11 is higher than lower limit oil temperature Tlow but is lower than upper limit oil temperature Thi. This is because if the oil temperature is not equal to or higher than a predetermined temperature, there is a possibility that a predetermined oil quantity cannot be filled (charged) before a complete combustion of engine fuel due to a viscous resistance of oil unless the oil temperature is equal to or higher than a predetermined oil temperature. In addition, if the oil temperature is at an excessively high temperature state, a volumetric efficiency of oil pump 8 is reduced due to a reduction of viscous resistance and a leakage quantity of each part of the valves is increased. Similarly, there is a possibility that a predetermined oil quantity to a clutching element before the complete combustion of the engine cannot be filled (charged).

Next, if the brake (pedal) is released, CVT control unit 9 determines that the driver has the intention to restart the engine. In addition, even though the brake (brake pedal) is under a depression state, when the idle stop switch is confirmed to be turned off, CVT control unit 9 determines that the driver has an intention to restart the engine. This is because, if the engine is stopped according to the state of the idle stop switch, a heavy burden is placed on a vehicular battery so that the driver cannot use an air conditioner. To prevent such an inconvenience as described above, when the driver feels that the temperature within a passenger compartment is hot, the intention of the driver can cause the idle stop control to be released (deactivated). Thus, a control along the intention of the driver can be executed.

If CVT control unit 9 determines that the driver has the intention to make the engine start (restart), engine (ENG) is restarted to operate the starter. At this time, since oil pump 8 is stopped during the engine stop. Hence, the working oil supplied to each of primary and secondary pulley cylinder chambers 33 and 37 of CVT 3 and forward clutch 25 is drained from the oil passages and whole hydraulic (pressure) is reduced. Hence, while the engine is restarted, it is necessary to supply the hydraulic (pressure) to forward clutch 25 during the restart of the engine since the engagement state of forward clutch 25 is released (deactivated).

Figure 4:
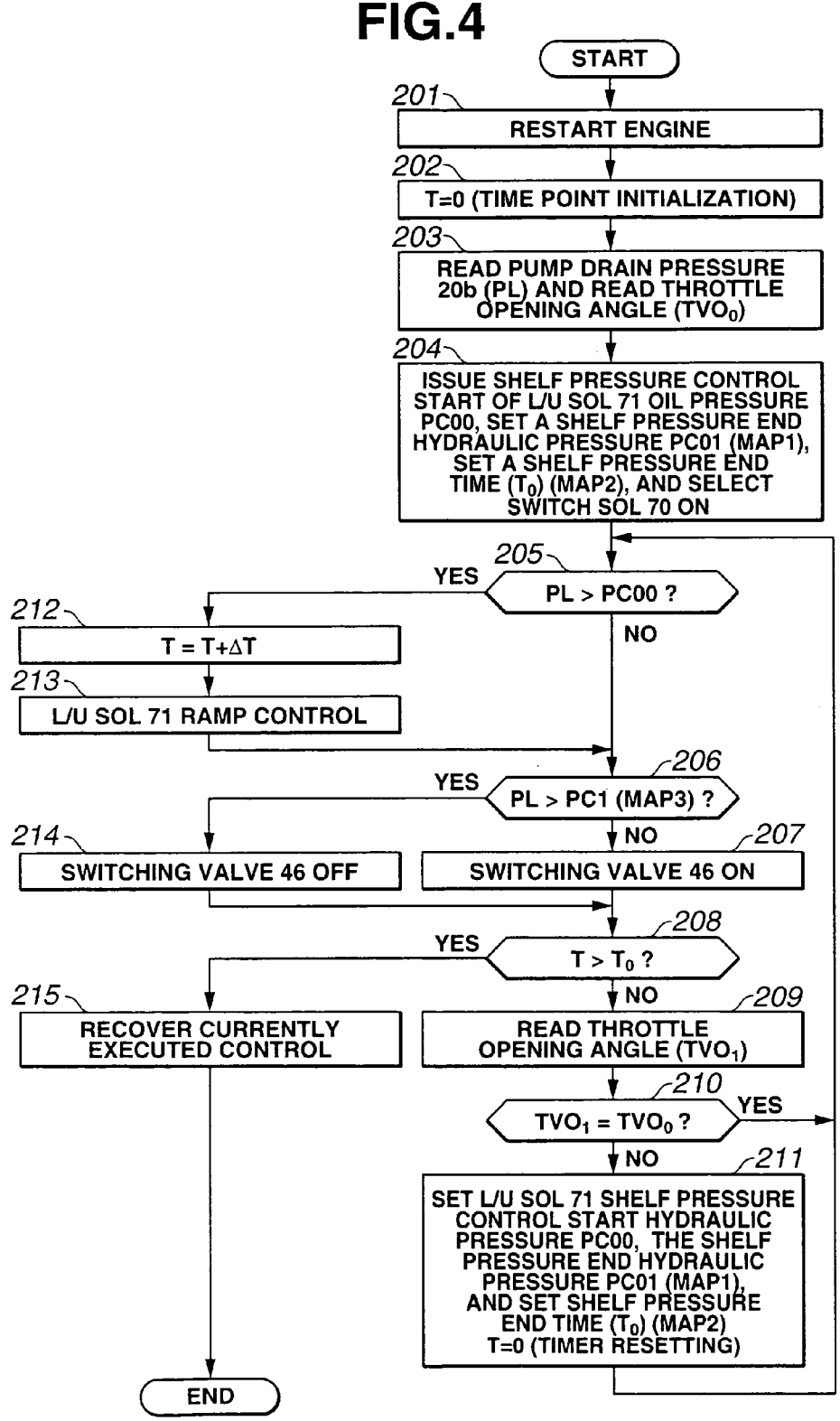
FIG. 4 is an operational flowchart representing an engine restart control procedure of the shift hydraulic apparatus in the preferred embodiment according to the present invention.

(Engine Restart Control) Next, the details of the engine restart control will be described below. FIG. 4 shows a flowchart representing the engine restart control of the shift hydraulic apparatus in the preferred embodiment according to the present invention.

Figure 6:
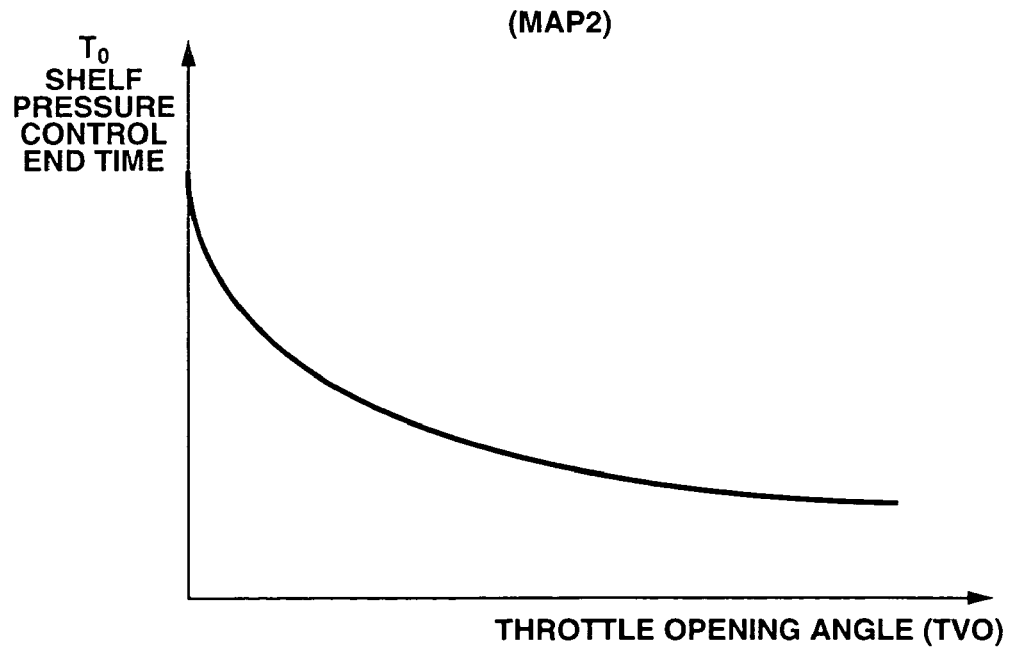
FIG. 6 is a map (map 2) representing a relationship between a throttle opening angle and a shelf pressure control end time TO (duration).
Figure 7:
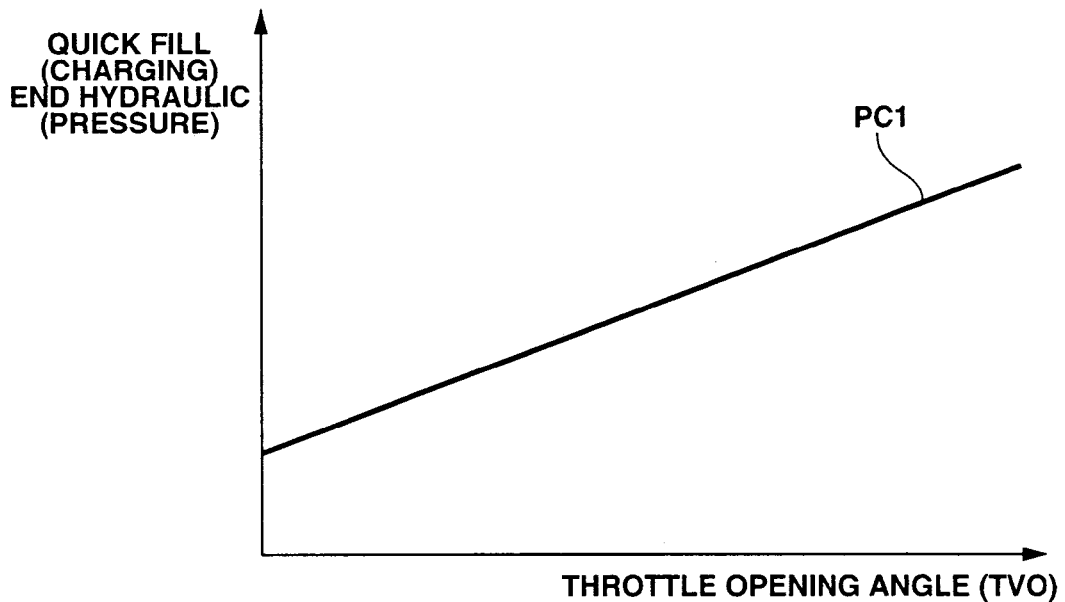
FIG. 7 is a map (map 3) representing a relationship between an opening angle of the throttle valve and a switching hydraulic of switching valve (namely, a quick charging end hydraulic).

At a step 201, a starter motor is driven to restart engine (ENG). At a step 202, an initialization of a timer (T) value is executed (T=0). At a step 203, CVT control unit 9 reads a pump drainage pressure 20$b$ (corresponding to a line pressure PL) from a pump drainage pressure sensor 14 and reads a throttle opening angle (TVO but herein $TVO_0$) from accelerator opening angle sensor 10. At a step 204, CVT control unit 9 outputs a shelf pressure start command of lock-up solenoid 71 to set a shelf pressure start hydraulic (pressure) PC00 and shelf pressure end hydraulic (pressure) PC01 in accordance with the present throttle valve opening angle ($TVO_0$) from MAP1 shown in FIG. 5. Then, CVT control unit 9 sets a shelf pressure end time $T_0$ in accordance with throttle valve opening angle ($TVO_0$) from MAP2 shown in FIG. 6. In addition, a quick charge end hydraulic pressure PC1 is set in accordance with the throttle valve opening angle ($TVO_0$) from MAP3 shown in FIG. 7. In addition, select switching solenoid 70 is turned to ON (activated).

At a step 205, CVT control unit 9 determines whether line pressure PL is higher than shelf pressure start hydraulic PC00. If PL is higher than shelf pressure start hydraulic PC00 (Yes) at step 205, the routine goes to a step 212. If No (PL≦PC00) at step 205, the routine goes to a step 206. At step 206, CVT control unit 9 determines whether line pressure PL is higher than set quick fill (charging) end hydraulic pressure PC1. If higher than quick charging (fill) end hydraulic pressure PC1, the routine goes to a step 214. If No (PL≦PC1) at step 206, the routine goes to a step 207 in which switching valve 46 shown in FIG. 2 is turned to ON. At step 208, CVT control unit 9 determines whether the timer value (T) is larger than set shelf pressure end time $T_0$. If the timer value (T) is larger than shelf pressure end time $T_0$ at step 208, the routine goes to a step 215. If not larger than shelf pressure end time $T_0$ (No) at step 208, the routine goes to a step 209. At step 209, CVT control unit 9 reads again the present throttle valve opening angle (TVO but herein $TV0_1$). At step 210, CVT control unit 9 determines whether throttle valve opening angle $TVO_1$ is the same as throttle valve opening angle $TV0_0$ read at step 204. If $TV0_1=TVO_0$ (Yes) at step 210, the routine returns to step 205. If $TV0_1 \neq TVO_0$ at step 210, the routine goes to a step 211.

Figure 5:
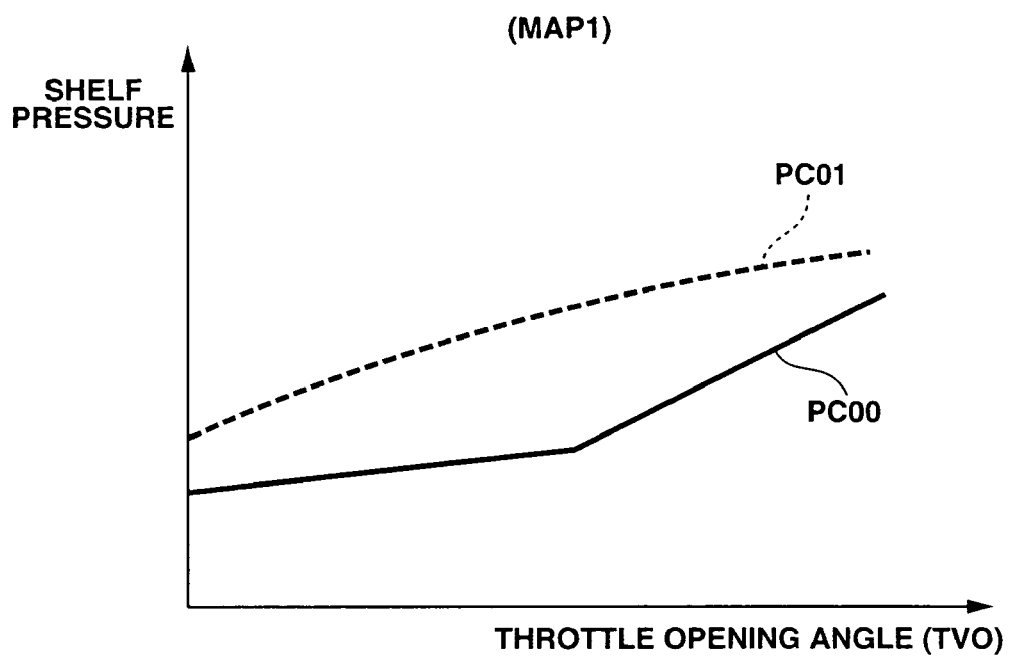
FIG. 5 is a map (map 1) representing a relationship between a throttle (valve) opening angle and a shelf pressure.
Figure 8:
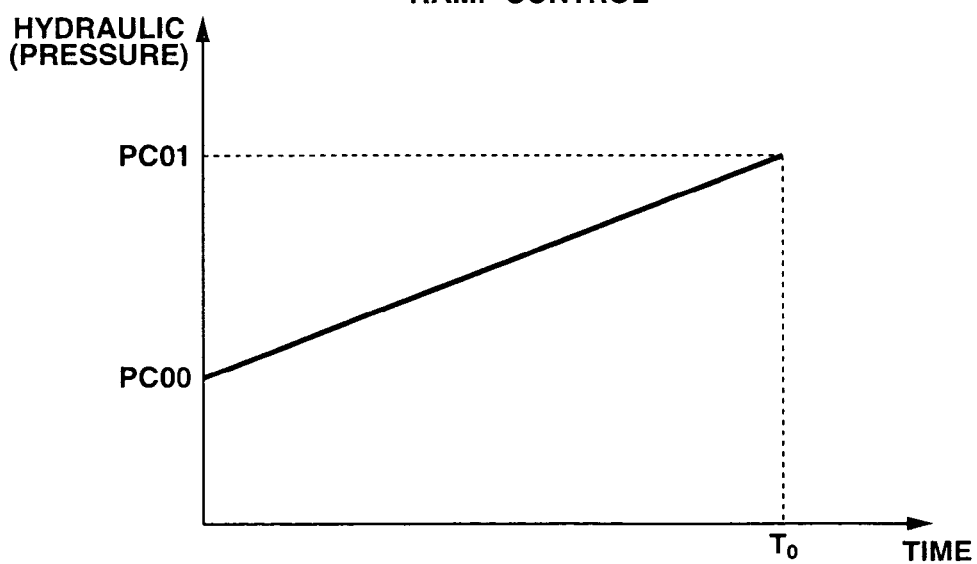
FIG. 8 is a map representing a ramp control in the shelf pressure control end time TO shown in FIG. 6.

At step 211, CVT control unit 9 again sets the shelf pressure start hydraulic (pressure) PC00 and shelf pressure end hydraulic (pressure) PC01 in accordance with throttle valve opening angle TVO from the map (MAP1) shown in FIG. 5. In addition, CVT control unit 9 sets shelf pressure end time $T_0$ in accordance with throttle valve opening angle $TVO_1$ from MAP1 shown in FIG. 6. In addition, the timer T is initialized (T=0). On the other hand, at step 212, CVT control unit 9 counts up (increments) timer T by ΔT (T=T+ΔT). At the next step 213, CVT control unit 9 performs a ramp control from PC00 to PC01 as shown in FIG. 8 for lock-up solenoid 71.

At step 214, switching valve 46 is turned to OFF. In addition, at step 215, CVT control unit 9 returns to an ordinary hydraulic control (recovering of the currently executed ordinary (shift) hydraulic control.

A result of the above-described engine restart control procedure with reference to FIG. 4 will be described on the basis of an integrated timing chart shown in FIGS. 9A through 9I.

That is to say, when, at a time point of t1, a brake signal is turned to OFF and the accelerator is depressed, a starter motor serves to perform an engine cranking to restart the engine upon a depression of the accelerator pedal.

At the same time, CVT control unit 9 sets shelf pressure start hydraulic PC00 (solid line of FIG. 5) and shelf pressure end hydraulic PC01 (dot line of FIG. 5) in accordance with the opening angle of the detected throttle valve from the map MAP1 shown in FIG. 5. In addition, CVT control unit 9 sets shelf pressure end time $T_0$ in accordance with an opening angle of the throttle valve from the map MAP2 shown in FIG. 6. In addition, the quick fill (charging) end hydraulic (pressure) PC1 is set in accordance with the opening angle of the throttle valve from the map MAP3 shown in FIG. 7. In addition, select switching solenoid 70 is turned to ON.

Furthermore, a command value corresponding to shelf pressure start hydraulic PC00 is outputted to lock-up solenoid 71. In a case of the hydraulic apparatus in this preferred embodiment, a two-way valve is used for lock-up solenoid 71. The draining of the hydraulic supplied from pilot valve 50 generates a command signal of lock-up solenoid 71. Hence, it is desirable that the command signal from lock-up solenoid 71 for select control valve 92 is set to zero. However, since the hydraulic is not drained from lock-up solenoid 71, the command signal corresponding to set shelf pressure start hydraulic PC00 is outputted to lock-up solenoid 71.

It is noted that, in a case where lock-up solenoid constitutes a three-way valve, in the same way as the two-way valve constituting lock-up solenoid 11, a quicker hydraulic charging speed can be obtained by not draining an input side of lock-up solenoid 92 until a predetermined hydraulic is obtained in the same way as the three-way valve (select control valve full open).

Immediately after the engine restart, the hydraulic is not sufficiently obtained. Hence, with switching valve 46 turned on, the hydraulic derived from oil pump 8 is supplied in such a route as oil passage 8$a$→oil passage 8$b$→oil passage 8$c$→switching valve 46→oil passage 46$a$→oil passage 42$a$→select control valve 90→oil passage 93→select switching valve 75→oil passage 77→manual valve 60 and finally supplied to forward clutch 25. At a time point t2, if the line pressure reaches to shelf pressure start oil pressure PC00, shelf pressure timer (T) is started to be counted. A ramp control over lock-up solenoid 71 from shelf pressure start hydraulic PC00 shown in FIG. 8 is started.

At time point t2, if line pressure PL reaches to set shelf pressure start hydraulic PC00 (refer to FIG. 9D), a count of the shelf pressure timer (T) is started and a ramp control of lock-up solenoid 71 shown in FIG. 8 is started.

At a time point t3, upon the confirmation of a complete combustion (burning) of engine (ENG), engine starter is turned to OFF. It is noted that the complete combustion determination may be executed when, for example, engine revolution speed (Ne) is equal to or higher than a predetermined revolution speed (No) and becomes stable.

At a time point of t4, when the line pressure reaches to set quick charging end hydraulic PC1 according to the opening angle (TVO) of the engine throttle valve, switching valve 46 is, in turn, turned to OFF. At this time, the hydraulic pressure supply to forward clutch 25 is supplied from oil passage 8$a$→oil passage 41→oil passage 42$a$→select control valve 92→oil passage 93→select switching valve 75→oil passage 77→manual valve 60 and finally supplied to forward clutch 25.

At a time point of t5, when the shelf pressure timer indicates the shelf pressure end time ($T_0$), the ramp control of lock-up solenoid 71 is ended and lock-up solenoid 71 is turned to OFF.

At a time point of t6, lock-up solenoid 11 is turned to OFF (refer to FIG. 9G). Thus, forward clutch 25 receives the hydraulic regulated by means of clutch regulator valve (CL. REG. V) 45. In this state, select switching valve 75 is turned to OFF. At this time, with oil passage 42 and oil passage 77 under the communication state, a communication between the signal pressure supply oil passage 71a from lock-up solenoid 71 and lock-up control valve (L/U CONT.V) (not shown) is communicated. Thus, the control is transferred to the ordinary control.

As described above, in the shift hydraulic (pressure control) apparatus for the vehicular automatic transmission (belt type CVT) in the preferred embodiment according to the present invention, under a state where the pump hydraulic at a time of engine restart after the idle stop is not sufficiently developed, even if the hydraulic from pressure regulator valve 40 which constitutes an upstream side hydraulic circuit is not drained, a line pressure (insufficient hydraulic) drained from oil pump 8 by means of switching valve 45 (which is turned on) is supplied to a downstream side hydraulic circuit regulated by means of clutch regulator valve 45. Thus, the hydraulic can be supplied to forward clutch 25. As described above, during the start time of the engine restart, a clutching (engagement) pressure of forward clutch 25 is supplied from the downstream side hydraulic circuit which is communicated with upstream side hydraulic circuit. At the same time as the rise in line pressure PL, the clutch engagement pressure of forward clutch 25 is raised together so that forward clutch 25 is quickly reached to a clutch enabling state. Then, at the same time as the engine restart after the idle stop, switching valve 46 is under a communication state (turned on). When the hydraulic of the upstream side hydraulic circuit detected by means of pulley clamp pressure sensor 14 indicates set hydraulic PC1 (refer to FIG. 9D and FIG. 7) immediately before it reaches to a set hydraulic at which the drainage is started from clutch regulator valve 45 on the downstream side hydraulic circuit, switching valve 45 is switched to a non-communication state. Hence, it becomes possible to supply the hydraulic to forward clutch 25 efficiently from the upstream side hydraulic circuit. At a time point immediately before the vehicle is started upon the end of engine restart, a predetermined clutch pressure can be set and a smooth start of the engine can be assured.

In addition, since switching valve 46 is constituted by an electromagnetically operated switching valve, the communication state and the non-communication state can quickly be switched at an arbitrary timing. Even if switching valve 46 is troubled in an electrical failure, an accurate interruption state on the communication state can be made.

Furthermore, the hydraulic is supplied to forward clutch 25 using select switching valve 75 and select control valve 90. That is to say, when the hydraulic is supplied to forward clutch 25 during the engine restart, the clamp pressure is simultaneously supplied to primary and secondary pressure chamber 35 and 37. Hence, there is a possibility that an accurate determination cannot be made that the clamp pressure is fully secured due to an excessive smoothness of the hydraulic supply to the forward clutch 25. To avoid this uncertainty, select control valve 90 is regulated (adjusted) by the signal pressure of lock-up solenoid 71 and the hydraulic is supplied to forward clutch 25 via select control valve 90 and select switching valve 75. On the basis of this structure, the shelf pressure control is executed so that a throttling action permits an avoidance of the occurrence in belt slip along with a reduction of pump draining pressure and an execution of an optimum shelf pressure control such as described above over forward clutch 25 permits the smooth start of the vehicle after the engine restart. It is noted that, in FIG. 2, a reference numeral 8f denotes an orifice, a reference numeral 8ff denotes other orifices, two opposite check valves are disposed within oil passage 61 in parallel to other orifices 8ff, an abbreviation of PMF.V represents a pressure modifier valve to modify the pressures in both pressure regulator valve 40 and clutch regulator valve, and T/C REG. V shown in FIG. 2 corresponds to a torque converter regulator valve to regulate the hydraulic supplied to torque converter 1.

Various changes and modifications may be made without departing from the sprit and scope of the present invention defined in the appended claims. The entire contents of a Japanese Patent Application No. 2003-029176 (filed in Japan on Feb. 6, 2003) are herein incorporated by reference.

What is claimed is:

1. A shift hydraulic apparatus for a vehicular automatic transmission, the automatic transmission being constituted by a torque converter and a continuously variable transmission, the shift hydraulic apparatus comprising:
    an upstream oil pump that is always driven by means of an engine associated with the automatic transmission;
    a clamp pressure regulating section, disposed on an upstream side hydraulic circuit with the oil pump as a hydraulic source, that regulates a clamp pressure of a belt of the continuously variable transmission;
    a clutch pressure regulating section, disposed on a downstream hydraulic circuit with a drain pressure from the clamp pressure regulating section, that regulates a clutching pressure of a forward clutch;
    a bypass circuit which enables the upstream side hydraulic circuit to communicate with the downstream side hydraulic circuit;
    a switching valve which enables a switching between a communication state of the bypass circuit and a non-communication state of the bypass circuit; and
    a switching valve controlling section that controls the communication state and the non-communication state of the bypass circuit through the switching valve.

2. A shift hydraulic apparatus for a vehicular automatic transmission, the automatic transmission being constituted by a torque converter and a continuously variable transmission, the shift hydraulic apparatus comprising:
    an oil pump that is always driven by means of an engine associated with the automatic transmission;
    a clamp pressure regulating section, disposed on an upstream side hydraulic circuit with the oil pump as a hydraulic source, that regulates a clamp pressure of a belt of the continuously variable transmission;
    a clutch pressure regulating section, disposed on a downstream hydraulic circuit with a drain pressure from the clamp pressure regulating section, that regulates a clutching pressure of a forward clutch;
    a bypass circuit which enables the upstream side hydraulic circuit to communicate with the downstream side hydraulic circuit;
    a switching valve which enables a switching between a communication state of the bypass circuit and a non-communication state of the bypass circuit;

a switching valve controlling section that controls the communication state and the non-communication state of the bypass circuit through the switching valve; and an upstream side hydraulic circuit oil pressure detecting section that detects a hydraulic at the upstream side hydraulic circuit, wherein the switching valve controlling section comprises a bypass circuit controlling section that turns the switching valve on to enable the bypass circuit to be in the communication state at the same time when the engine (ENG) is restarted after an idle stop and that turns the switching valve off to enable the bypass circuit to be in the non-communication state immediately before the detected oil pressure of the upstream side hydraulic circuit has reached to a predetermined hydraulic (PC1) approximately equal to a clutching pressure in the downstream side hydraulic circuit.

3. A shift hydraulic apparatus for a vehicular automatic transmission as claimed in claim 1, wherein the switching valve is an electromagnetic switching valve that causes the bypass circuit to be in the communication state when the switching valve controlling section has outputted a control signal to the switching valve and causes the bypass circuit to be in the non-communication state when the switching valve controlling section does not output the control signal to the switching valve.

4. A shift hydraulic apparatus for a vehicular automatic transmission, the automatic transmission being constituted by a torque converter and a continuously variable transmission, the shift hydraulic apparatus comprising:

an oil pump that is always driven by means of an engine associated with the automatic transmission;

a clamp pressure regulating section, disposed on an upstream side hydraulic circuit with the oil pump as a hydraulic source, that regulates a clamp pressure of a belt of the continuously variable transmission;

a clutch pressure regulating section, disposed on a downstream hydraulic circuit with a drain pressure from the clamp pressure regulating section, that regulates a clutching pressure of a forward clutch;

a bypass circuit which enables the upstream side hydraulic circuit to communicate with the downstream side hydraulic circuit;

a switching valve which enables a switching between a communication state of the bypass circuit and a non-communication state of the bypass circuit; and a switching valve controlling section that controls the communication state and the non-communication state of the bypass circuit through the switching valve, wherein the downstream side hydraulic circuit comprises:

a pressure regulating valve section and a pressure regulating valve section controlling section that controls the pressure regulating valve section, both of the pressure regulating valve section and the pressure regulating valve section controlling section being interposed on the downstream side hydraulic circuit between a clutch pressure regulating valve and a forward clutch, that reduces the hydraulic of the clutching pressure regulating valve to enable a shelf pressure control for the forward clutch; and a pressure regulating valve controlling section that controls the pressure regulating valve section, the pressure regulating valve section controlling section executing a predetermined shelf pressure control when the engine is restarted after the engine idle stop.

5. A shift hydraulic apparatus for a vehicular automatic transmission as claimed in claim 4, wherein the switching valve controlling section comprises:

an idle stop condition determining section that determines whether all of engine idle stop conditions are satisfied and a D range determining section that determines whether the transmission falls in a D range when the idle stop condition determining section determines that all of the engine idle stop conditions are satisfied;

an oil temperature detecting section that detects an oil temperature of the upstream and downstream side hydraulic circuits;

an oil temperature determining section that determines whether the detected oil temperature (Toil) falls in a range between an upper limit oil temperature (Thi) and a lower limit oil temperature (Tlow) when the D range determining section determines that the transmission falls in the D range; and an engine stopping section that stops the engine when the oil temperature determining section determines that the detected oil temperature (Toil) falls in the range (Tlow<Toil<Thi).

6. A shift hydraulic apparatus for a vehicular automatic transmission, the automatic transmission being constituted by a torque converter and a continuously variable transmission, the shift hydraulic apparatus comprising:

an oil pump that is always driven by means of an engine associated with the automatic transmission;

a clamp pressure regulating section, disposed on an upstream side hydraulic circuit with the oil pump as a hydraulic source, that regulates a clamp pressure of a belt of the continuously variable transmission;

a clutch pressure regulating section, disposed on a downstream hydraulic circuit with a drain pressure from the clamp pressure regulating section, that regulates a clutching pressure of a forward clutch;

a bypass circuit which enables the upstream side hydraulic circuit to communicate with the downstream side hydraulic circuit;

a switching valve which enables a switching between a communication state of the bypass circuit and a non-communication state of the bypass circuit; and a switching valve controlling section that controls the communication state and the non-communication state of the bypass circuit through the switching valve, the switching valve controlling section comprising:

a brake operation determining section that determines whether a brake switch is turned on to determine whether a vehicular brake operation is carried out after an engine stopping section stops the engine; and an engine restart controlling section that controls the hydraulic of the upstream and downstream side hydraulic circuits during an engine restart when the brake operation determining section determines that the brake switch is turned off.

7. A shift hydraulic apparatus for a vehicular automatic transmission as claimed in claim 6, wherein the engine restart controlling section comprises:

a line pressure detecting section that detects a line pressure; and a throttle valve opening angle detecting section that detects an opening angle of an engine throttle valve at the same time of a detection of the line pressure (PL) by the line pressure detecting section a first shelf pressure control setting section that sets:

a shelf pressure control start command hydraulic (PC00) for a lock-up solenoid constituting the pressure regulating valve section controlling section, a shelf pressure control end hydraulic (PC01) of the lock-up solenoid, a quick charging end hydraulic (PC1) corresponding to the predetermined hydraulic, and a shelf pressure control end time ($T_0$), and wherein each of the shelf pressure control start command hydraulic (PC00), the shelf pressure control end hydraulic (PC01), the quick charging end hydraulic (PC1), and the shelf pressure control end time ($T_0$) is set in accordance with the detected opening angle ($TVO_0$) of the engine throttle valve, with a select switching solenoid of a select switching valve turned on, the select switching solenoid constituting the pressure regulating valve section controlling section.

8. A shift hydraulic apparatus for a vehicular automatic transmission as claimed in claim 7, wherein the engine restart controlling section further comprises:

a first line pressure determining section that determines whether the line pressure (PL) is higher than the shelf pressure control start command hydraulic (PC00) when the first shelf pressure control setting section sets:

the shelf pressure control start command hydraulic (PC00) for the lock-up solenoid, the shelf pressure control end hydraulic (PC01) of the lock-up solenoid, the quick charging end hydraulic (PC1), and the shelf pressure control end time ($T_0$).

9. A shift hydraulic apparatus for a vehicular automatic transmission as claimed in claim 8, wherein the engine restart controlling section further comprises:

a second line pressure determining section that determines whether the line pressure (PL) is higher than the quick charging end hydraulic (PC1) when the first line pressure determining section determines that the line pressure is equal to or lower than the shelf pressure control start command hydraulic (PC00).

10. A shift hydraulic apparatus for a vehicular automatic transmission as claimed in claim 9, wherein, when the second line pressure determining section determines that the line pressure (PL) is equal to or lower than the quick charging end hydraulic (PC1), the switching valve is turned on to render the bypass circuit in the communication state, and wherein, when the second line pressure determining section determines that the line pressure (PL) is higher than the quick charging end hydraulic (PC1), the switching valve is turned off to render the bypass circuit in the non-communication state.

11. A shift hydraulic apparatus for a vehicular automatic transmission as claimed in claim 10, wherein the engine restart controlling section further comprises:

a count value determining section that determines whether a period of time read by a timer (T) from a time at which the shelf pressure control is started to the shelf pressure control end time ($T_0$) has passed.

12. A shift hydraulic apparatus for a vehicular automatic transmission as claimed in claim 11, wherein the engine restart controlling section further comprises:

a detection value reading section that reads the present opening angle ($TVO_1$) of the throttle valve at the present time;

a throttle valve opening angle determining section that determines whether the read opening angle ($TVO_1$) of the throttle valve is equal to the previous opening angle ($TVO_0$) detected by the opening angle detecting section; and a second shelf pressure control setting section that again sets:

the shelf pressure control start command hydraulic (PC00) of the lock-up solenoid, the shelf pressure control end hydraulic (PC01), and the shelf pressure control end time ($T_0$)

in accordance with the present opening angle of the throttle valve ($TVO_1$), and wherein, with the timer value (T) reset to zero (T=0) when the throttle valve opening angle determining section determines that the present read opening angle ($TVO_1$) of the throttle valve is not equal to the previous detection value of the opening angle ($TVO_0$) of the throttle valve.

13. A shift hydraulic apparatus for a vehicular automatic transmission as claimed in claim 12, wherein the engine restart controlling section further comprises:

a ramp control section that performs a ramp control for the lock-up solenoid for the hydraulic of the forward clutch to increase the hydraulic from the shelf pressure control start command hydraulic (PC00) to the shelf pressure control end hydraulic (PC01) with the timer value (T) incremented by $\Delta T$ when the first line pressure determining section determines that the line pressure (PL) is higher than the set shelf pressure control start hydraulic (PC00).

14. A shift hydraulic apparatus for a vehicular automatic transmission as claimed in claim 13, wherein, when the count determining section of the engine restart controlling section determines that the timer count value (T) has reached to the shelf pressure control end time ($T_0$), the engine restart control by means of the engine restart controlling section is transferred to an ordinary hydraulic control.

15. A shift hydraulic apparatus for a vehicular automatic transmission as claimed in claim 14, wherein, when the throttle valve opening angle determining section determines that the present opening angle ($TVO_1$) of the throttle valve is equal to the previous opening angle ($TVO_0$) and when the second shelf pressure controlling section again sets:

the shelf pressure control start command hydraulic (PC00) for the lock-up solenoid, the shelf pressure control end hydraulic (PC01), and the shelf pressure control end time ($T_0$), and wherein, with the timer value (T) being reset to zero (T=0), the first line pressure determining section determines whether the line pressure (PL) is higher than the shelf control start command hydraulic (PC00) set at the second shelf pressure controlling section.

16. A shift hydraulic method for a vehicular automatic transmission, the automatic transmission being constituted by a torque converter and a continuously variable transmission, the shift hydraulic method comprising:

providing an upstream oil pump that is always driven by means of an engine associated with the automatic transmission;

providing a clamp pressure regulating section, disposed on an upstream side hydraulic circuit with the oil pump as a hydraulic source, that regulates a clamp pressure of a belt of the continuously variable transmission;

providing a clutch pressure regulating section, disposed on a downstream hydraulic circuit with a drain pressure from the clamp pressure regulating section, that regulates a clutching pressure of a forward clutch;

providing a bypass circuit which enables the upstream side hydraulic circuit to communicate with the downstream side hydraulic circuit;

providing a switching valve which enables a switching between a communication state of the bypass circuit and a non-communication state of the bypass circuit; and controlling the communication state and the non-communication state of the bypass circuit through the switching valve.

* * * * *